ELECTROLUMINESCENT DEVICE AND METHOD OF MAKING

Filed March 16, 1961

INVENTORS
ROBERT J. BLAZEK and
HANS B. BULLINGER.
BY
W. D. Palmer
ATTORNEY 3,110,836

ELECTROLUMINESCENT DEVICE AND METHOD OF MAKING

Robert J. Blazek, Mendham, and Hans B. Bullinger, Bloomfield, N.J., assignors to Westinghouse Electric Corporation, East Pittsburgh, Pa., a corporation of Pennsylvania Filed Mar. 16, 1961, Ser. No. 96,119
6 Claims. (Cl. 313—108)

This invention relates to electroluminescent devices and more particularly, to a plastic-type electroluminescent device, an electrical lead-in conductor sealed in such manner as to be substantially impervious to ingress of moisture, and methods for forming such a seal and for forming plastic-type electroluminescent devices.

The phenomenon of electroluminescence is now well known and electroluminescent devices have been marketed commercially. In the usual form of such devices, a glass or metallic foundation supports the structure and the operative device portions are formed on this rigid foundation. If it is desired to make a flexible electroluminescent device, the operative device portions are normally formed on flexible plastic. So-called plastic-type electroluminescent devices are known and are described in U.S. Patent No. 2,901,652, dated August 25, 1959.

Electroluminescent devices are susceptible to damage by atmospheric moisture. In the device constructions wherein a rigid foundation is utilized, it is customary to encase or encapsulate the device in a moisture-impervious glass, ceramic or resin. In the case of flexible electroluminescent devices, however, it is necessary to encase or encapsulate the device in a flexible plastic which is substantially impervious to penetration by moisture. In fabricating such a flexible device, difficulties are encountered in making a moisture-impervious seal about the electrical lead-in conductors which are required to carry the power to the operating electrodes. If a relatively large, single piece, lead-in conductor is utilized, there is a tendency to develop leaks or paths for moisture penetration. The same troubles are encountered with a flattened lead-in conductor. It has been disclosed in U.S. Patent No. 2,945,976, dated July 19, 1960, to utilize a metal screen as an electrical lead-in conductor. The use of such a screen is advantageous in that it is easier to heat seal the plastic about the screen to form a relatively effective barrier against the penetration of moisture. Fine screens are extremely difficult to handle on a practical basis when fabricating the device, however, thereby increasing the expense involved and as well as the production "shrinkage" or failures.

It is the general object of this invention to avoid and overcome the foregoing and other difficulties of and objections to the prior-art practices by the provision of a method for sealing an electrical lead-in conductor, formed of fine metal wires, against ingress of moisture.

It is another object to provide a method for fabricating a plastic-type electroluminescent device which is substantially sealed against ingress of moisture.

It is a further object to provide an electrical lead-in conductor which is sealed through light-transmitting, substantially moisture-impervious thermoplastic, with the seal about the lead-in conductor being substantially impervious to moisture.

It is an additional object to provide an electroluminescent device in which the lead-in conductors have been sealed through the encasing portion of the device by an improved method.

The aforesaid objects of the invention, and other objects which will become apparent as the description proceeds, are achieved by providing an improved method for sealing an electrical lead-in against ingress of moisture. In practicing this method, a plurality of fine wires are placed adjacent to a thermoplastic layer. Heat and pressure are applied to the plastic and wires substantially to embed the wires into the plastic. Thereafter the wire-embedded plastic layer is sandwiched between two layers of similar plastic. The two layers of similar plastic are then heat-sealed onto the sandwiched wire-embedded plastic, in order to form a seal which is substantially impervious to moisture. There is also provided a generally similar method for fabricating a plastic-type electro-luminescent device.

For a better understanding of the invention, reference should be had to the accompanying drawings wherein.

Although the principles of the present invention are broadly applicable to sealing an electrical lead-in conductor through plastic, the invention is particularly applicable to plastic-type electroluminescent devices and hence it has been so illustrated and will be so described.

Figure 1:
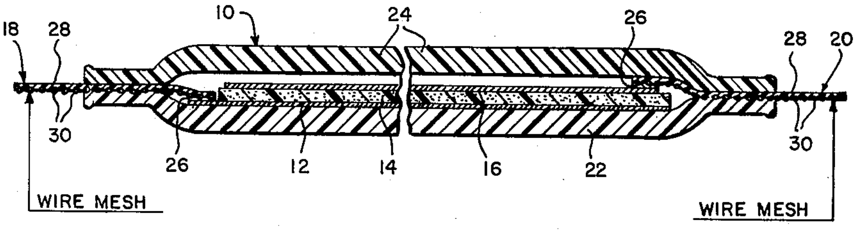
FIG. 1 is a sectional elevational view of a plastic-type electroluminescent device fabricated in accordance with the present invention.

With specific reference to the form of the invention illustrated in the drawings, the numeral 10 in FIG. 1 indicates generally a flexible, plastic-type electroluminescent device. The device 10 comprises a first light-transmitting, electrically conductive electrode 12, a layer 14 thereover comprising electroluminescent phosphor embedded in light-transmitting dielectric, and a second electrode 16 over the phosphor-dielectric layer 14. Electrical lead-in conductors 18 and 20 are sealed through the ends of the device 10 and respectively connect to the electrodes 12 and 16. The device is encased in layers 22 and 24 formed of light-transmitting, heat-sealable thermoplastic material. The layers 22 and 24 are sealed about the lead-in conductors 18 and 20.

As a specific example, the light-transmitting electrode 12 is formed of sputtered gold, or gold having an additive of tungsten oxide, or gold having an additive of both tungsten oxide and iron oxide, as described in copending application 65,689, filed October 28, 1960, and owned by the present assignee. The phosphor-dielectric layer 14 is formed of any suitable electroluminescent phosphor embedded in any suitable light-transmitting dielectric material. As an example, copper-activated zinc sulfide electroluminescent phosphor in finely divided form is embedded in an equal part by weight of polyvinyl-chloride dielectric material and the thickness of the layer 14 is approximately 2 mils. The electrode 16 is formed of vacuum-metallized aluminum. Other additional layers can be included between the electrodes 12 and 16 in order to improve the breakdown characteristics of the device. As an example, an additional layer of barium titanate can be included between the device electrodes, if desired. Alternatively, phosphor powder per se can be included with an additional layer of dielectric material. The electrical lead-in conductors 18 and 20, which will be described in greater detail hereinafter, are affixed to the electrodes 12 and 16 respectively by means of silver-epoxy resin cement bonds 26. The thermo-plastic encasing layers 22 and 24 are conveniently formed of polymonochlorotrifluoroethylene having a thickness of ten mils, for example.

The foregoing device construction is subject to considerable further modification. As an example, the electrode 16 can be formed of other vacuum-deposited material such as silver. Alternatively, the electrode 16 can be made light transmitting in nature, if desired, such as by forming it of sputtered gold or other gold-modified compounds, as indicated hereinbefore, or the electrode 16 can be formed of a mesh of wires. Similarly, the light-transmitting electrode 12 can be formed of a mesh of wires, if desired. The thickness of the phosphor-dielectric layer 14 is not critical and other known electroluminescent phosphors and other known suitable dielectric materials can be substituted for the specific examples as given.

Figure 3:
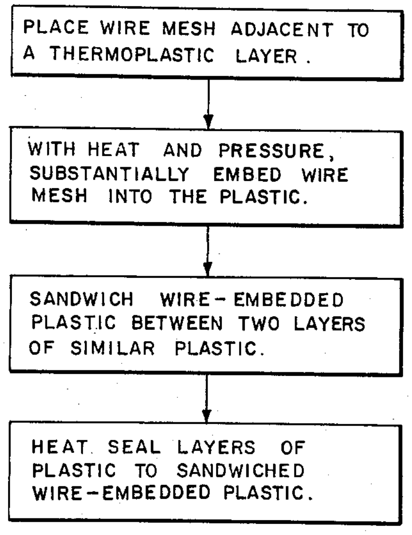
FIG. 3 is a flow chart illustrating the present method.

In forming each of the seals for the lead conductors 18 and 20 as shown in the flow chart, see FIG. 3, there is first placed against a three mil thick layer 28 of light-transmitting, substantially moisture-impervious, heat-sealable thermoplastic a plurality of spaced and proximate fine metal wires 30. The plastic layer 28 is similar in composition to the plastic layers 22 and 24, in order to facilitate heat sealing. Preferably these fine metal wires 30 are in the form of a wire mesh. As an example, this mesh is formed of wires having a diameter of one mil, and mesh openings of three mils. It should be understood, however, that the wires 30 need not take the form of a mesh, but can be formed of a plurality of generally parallel wires which are slightly spaced from one another. The spaced and proximate wires 30 and adjacent thermoplastic layer 28 are heated to a predetermined temperature and there is applied therebetween sufficient pressure to cause the metal wires substantially to embed into the thermoplastic layer 28 without fracturing this thermoplastic layer 28. The actual pressures and temperatures utilized will vary with the thermoplastic material. In the case of a polymonochlorotrifluoroethylene thermoplastic, the wires and thermoplastic are heated to a temperature of approximately 230° C., at which temperature the thermoplastic will readily flow. The pressure utilized is approximately 10,000 p.s.i. Any other thermoplastic which meets the indicated requirements can be substituted for the foregoing specific example. Examples of such other suitable thermoplastics are polyethylene and polypropylene. In the case of polyethylene, a temperature of 150° C. and a pressure of 1,000 p.s.i. are satisfactory. In the case of polypropylene, a temperature of 180° C. and a pressure of 2,000 p.s.i. are satisfactory. When applying such pressures and temperatures substantially to embed the wires into the thermoplastic, only the very top portions of the wires will be exposed and the wire spacings or interstices, in the case of a mesh, will permit light to pass therethrough.

The resulting wire-embedded plastic is very easy to handle and can be readily cut to any desired shape. This is because the plastic into which the wire is embedded facilitates handling and cutting to the desired size and shape. Thereafter, the operative portions of the device are fabricated onto the base layer 22 of similar thermoplastic and the embedded wire lead-in conductors cut to any desired shape, affixed to the electrodes, and extended across the exposed portions of the edges of the thermoplastic layer 22. A second layer 24 of similar thermoplastic is then applied over the lower plastic layer 22 so as to overlap onto the exposed edges of the lower layer 22. Heat and pressure are then applied completely around the periphery of the plastic layers 22 and 24 in order to form an effective barrier seal which is substantially impervious to ingress of moisture. As a specific example, in the case of the preferred plastic, the heat sealing temperatures and pressures are as utilized when the wire is initially embedded into the thermoplastic layer 28.

Figure 2:
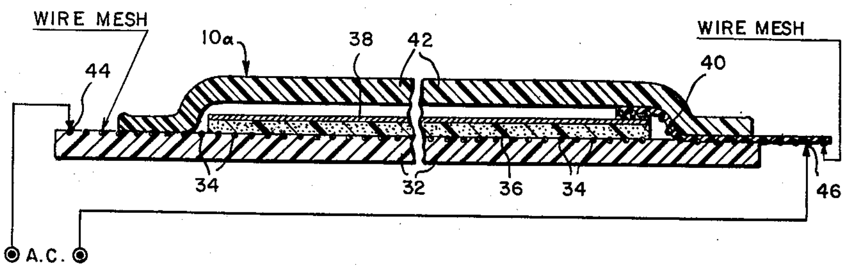
FIG. 2 is a sectional elevational view of an alternative embodiment of a plastic-type electroluminescent device fabricated in accordance with the present invention.

In FIG. 2 is shown an alternative device construction 10*a*. In this alternative construction, the base layer 32 of thermoplastic, such as polymonochlorotrifluoroethylene, has embedded in a substantial portion of its upper surface a plurality of spaced and proximate fine wires 34, such as a mesh, which serve as a light-transmitting electrode. Over the wire electrode 34 is formed the phosphor-dielectric layer 36, such as described hereinbefore. This phosphor dielectric layer 36 is formed over a substantial portion of the embedded wire electrode 34, with an edge portion of these embedded wires and all edge portions of the thermoplastic layer 32 uncovered with the phosphor layer 36. An additional electrode 38, which is formed of vacuum-metallized aluminum for example, is formed over the phosphor dielectric layer 36. A lead-in conductor 40, similar to the conductors 18 and 20 as shown in FIG. 1, is electrically connected to the electrode 38 and extends over an edge portion of the thermoplastic base 32. Thereafter the cover layer of thermoplastic 42, such as polymonochlorotrifluoroethylene, is placed over the electrode 38 and overlaps onto that portion of the embedded wires which are not covered with the phosphor layer 36 and also onto all other edge portions of the thermoplastic base 32. Thereafter pressures and temperatures, such as indicated hereinbefore, are applied completely around the periphery of the device 10*a*, in order to make an effective seal against ingress of moisture. Electrical contact is then made to the remaining exposed portion of the embedded wires, as indicated at 44, and to the exposed portion 46 of the lead conductor 40.

The device embodiment in FIG. 2 is subject to considerable modification in that the electrode 38 can be formed of a mesh of wire similar to the electrode 34. Alternatively, the electrode 38 can be formed of light-transmitting material, such as the previously mentioned modified gold coatings.

In the fabrication of either of the device embodiments 10 and 10*a*, as shown in FIGS. 1 and 2, the electrical lead-in conductors are readily handled and are not fragile because of the plastic in which they are initially embedded. In addition, the final heat seal for the device is readily effected since the wires are already substantially embedded into plastic and only the plastic surfaces need be heat sealed against one another. Such a seal is easily made and is very positive with respect to strength and preventing ingress of moisture.

It will be recognized that the objects of the invention have been achieved by providing a method for sealing an electrical lead-in conductor, formed of fine metal wires, against ingress of moisture. This method is useful in the fabrication of a plastic-type electroluminescent device. There has also been provided a lead-in conductor seal which has been formed by an improved method as well as an electroluminescent device which incorporates lead-in conductors which have been sealed through encasing plastic portions by an improved method.

While best embodiments of the invention have been illustrated and described in detail, it is to be particularly understood that the invention is not limited thereto or thereby.

We claim:

1. The method of sealing against ingress of moisture between substantially moisture-impervious heat-sealable thermoplastic layers a plurality of proximate electrically conducting fine metal wires, which method comprises, placing the plurality of spaced and proximate fine metal wires to be sealed adjacent to a light-transmitting heat-sealable thermoplastic layer, heating said metal wires and adjacent thermoplastic layer to a predetermined temperature and applying sufficient pressure therebetween to cause said metal wires substantially to embed into said thermoplastic layer without fracturing same, sandwiching said wire-embedded thermoplastic layer between two additional layers of similar thermoplastic, and applying sufficient temperature to said additional thermoplastic layers and said wire-embedded thermoplastic layer along with sufficient pressure to the exposed surfaces of said additional thermoplastic layers to effect a substantially moisture-impervious heat seal between said additional thermoplastic layers and the wire-embedded thermoplastic layer sandwiched therebetween.

2. The method as specified in claim 1, wherein said fine metal wires are in the form of a mesh of fine metal wires.

3. The method of fabricating a plastic-type electroluminescent device which is substantially sealed against ingress of moisture, which method comprises: placing a first electrically conducting layer comprising a plurality of spaced and proximate fine metal wires adjacent to a substantial portion of a first light-transmitting heat-sealable thermoplastic layer; heating said metal wires and adjacent thermoplastic layer to a predetermined temperature and applying sufficient pressure therebetween to cause said metal wires substantially to embed into said thermoplastic layer without fracturing same; placing a layer comprising electroluminescent phosphor over a substantial portion of said substantially embedded wires while leaving an edge portion of said substantially embedded wires and all edge portions of said thermoplastic layer uncovered with said layer comprising electroluminescent phosphor; placing an electrically isolated additional electrically conducting layer over said layer comprising electroluminescent phosphor, including an electrical lead-in electrically connecting to said additional electrically conducting layer and extending over an edge portion of said first thermoplastic layer; placing another layer of thermoplastic similar to said first thermoplastic layer over said additional electrode layer and overlapping onto a part of the phosphor-layer-uncovered portion of said substantially embedded wires and onto all other edge portions of said first thermoplastic layer; and applying sufficient temperature to the overlapping portions of said additional thermoplastic layer and said first thermoplastic layer and sufficient pressure between such overlapping thermoplastic layer portions to effect therebetween a substantially moisture-impervious heat seal.

4. The method as specified in claim 3, wherein said layer of fine metal wires has the form of a mesh of fine metal wires.

5. A lead-in conductor formed of fine metal wires sealed through light-transmitting substantially moisture-impervious heat-sealable thermoplastic, said lead-in conductor having been sealed through said plastic by the method which comprises, placing a plurality of spaced and proximate fine metal wires adjacent to a light-transmitting heat-sealable thermoplastic layer, heating said metal wires and adjacent thermoplastic layer to a predetermined temperature and applying sufficient pressure therebetween to cause said metal wires substantially to embed into said thermoplastic layer without fracturing same, sandwiching said wire-embedded thermoplastic layer between two additional layers of similar thermoplastic, and applying sufficient temperature to said additional thermoplastic layers and said wire-embedded thermoplastic layer along with sufficient pressure to the exposed surfaces of said additional thermoplastic layers to effect a substantially moisture-impervious heat seal between said additional thermoplastic layers and the wire-embedded thermoplastic layer sandwiched therebetween.

6. An electroluminescent device comprising: spaced electrically isolated and electrically conducting layers, at least one of which is light transmitting; a layer comprising electroluminescent phosphor including between said space conducting layers; substantially moisture-impervious light-transmitting heat-sealable thermoplastic encasing said conducting layers; lead-in conductors formed of a plurality of spaced and proximate fine metal wires sealed through said thermoplastic and electrically connecting to said electrically conducting layers; each of said lead-in conductors having been sealed through said thermoplastic by the method which comprises: placing a plurality of spaced and proximate fine metal wires adjacent to a light-transmitting heat-sealable thermoplastic layer, heating said metal wires and adjacent thermoplastic layer to a predetermined temperature and applying sufficient pressure therebetween to cause said metal wires substantially to embed into said thermoplastic layer without fracturing same, sandwiching said wire-embedded thermoplastic layer between two additional layers of similar thermoplastic, and applying sufficient temperature to said additional thermoplastic layers and said wire-embedded thermoplastic layer along with sufficient pressure to the exposed surfaces of said additional thermoplastic layers to effect a substantially moisture-impervious heat seal between said additional thermoplastic layers and the wire-embedded thermoplastic layer sandwiched therebetween.

References Cited in the file of this patent

UNITED STATES PATENTS 2,945,976 Fridrich ---------------- July 19, 1960
3,015,044 Burns ----------------- Dec. 26, 1961